United States Patent
Bahrami et al.

(10) Patent No.: US 11,003,442 B2
(45) Date of Patent: May 11, 2021

(54) APPLICATION PROGRAMMING INTERFACE DOCUMENTATION ANNOTATION

(71) Applicant: FUJITSU LIMITED, Kawasaki (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 16/411,934

(22) Filed: May 14, 2019

(65) Prior Publication Data
US 2020/0364044 A1    Nov. 19, 2020

(51) Int. Cl.
*G06F 8/73*    (2018.01)
*G06F 40/14*    (2020.01)
*G06F 40/169*    (2020.01)

(52) U.S. Cl.
CPC .............. *G06F 8/73* (2013.01); *G06F 40/14* (2020.01); *G06F 40/169* (2020.01)

(58) Field of Classification Search
None
See application file for complete search history.

(56) References Cited

U.S. PATENT DOCUMENTS

| | | | |
|---|---|---|---|
| 7,581,170 B2 | 8/2009 | Baumgartner et al. | |
| 8,745,641 B1* | 6/2014 | Coker | G06F 11/3668 719/328 |
| 9,489,373 B2 | 11/2016 | Simard et al. | |
| 10,313,451 B2* | 6/2019 | Prabhakar | H04L 67/2804 |
| 2003/0037312 A1* | 2/2003 | Czech | G06F 8/42 717/120 |
| 2011/0202933 A1* | 8/2011 | Sherrill | G06F 8/73 719/328 |
| 2015/0317156 A1* | 11/2015 | Chan | G06F 8/73 717/123 |

(Continued)

OTHER PUBLICATIONS

Gary Marchionini. Interfaces for end-user information seeking. Journal of the American society for information science, 43(2):156-163, 1992.

(Continued)

*Primary Examiner* — Ryan D. Coyer
(74) *Attorney, Agent, or Firm* — Maschoff Brennan

(57) ABSTRACT

A method may include receiving user input indicative of a style configuration for API formats. The method may include generating a style file that includes data representative of the style configurations. The method may include receiving an API documentation that includes API objects and determining an API format associated with the API documentation. Responsive to the API format associated with the API documentation satisfying a similarity threshold, the method may include generating a temporary file that includes data representative of the API documentation. The method may include generating a display file that includes data based on the style and temporary files. The display file may be generated to include a portion of the style and temporary files. The method may include directing display of a GUI that displays the API documentation based on the display file. Each API object may be displayed to include formatting according to the style configuration.

20 Claims, 10 Drawing Sheets

(56) References Cited

U.S. PATENT DOCUMENTS

2016/0011868 A1* 1/2016 Frenkiel .................. G06F 8/30
717/123
2016/0026461 A1* 1/2016 Bannister ................. G06F 8/73
717/123

OTHER PUBLICATIONS

Jason D Williams, Nobal B Niraula, Pradeep Dasigi, Aparna Lakshmiratan, Carlos Garcia Jurado Suarez, Mouni Reddy, and Geoff Zweig. Rapidly scaling dialog systems with interactive learning. In Natural Language Dialog Systems and Intelligent Assistants, pp. 1-13. Springer, 2015.
Robert Baumgartner, Sergio Flesca, and Georg Gottlob. Visual web information extraction with lixto. In The VLDB Journal, 2001.

* cited by examiner

REST API Reference

ServiceNow Provides Extensive Access To Instances Through A Set Of RESTful APIs. Below You Will Find A List Of The Available Endpoints With The Latest Information. For More Information About A Particular Endpoint, Applicable Query Parameters, A Sample Request In Multiple Formats, And A Sample Response Payload.

Additionally, You Can Discover These APIs From Within Your Instance By Using The REST API Explorer. If You Don't Find An API That Meets Your Needs You Can Create Custom REST APIs On ServiceNow Using Our Scripted REST API Features As Of The Geneva Release.

If You Are New To REST APIs Check Out Our Getting Started With REST Page.

ServiceNow REST APIs Support Basic Authentication And OAuth 2.0 To Authenticate Requests.

ServiceNow REST APIs Are Versioned. Use The Version Selectors Shown In The Lower Left Corner Of This Page To Choose Which Version Of The Documentation You Would Like To See.

Table API

The Table API Allows You To Perform Create, Read, Update, And Delete (CRUD) Operations On Existing Tables.

GET /now/table/{tableName}

This Method Retrieves Multiple Records For The Specified Table With Proper Pagination Information.

- Aggregate API
- Attachment API
- Clotho Time Series API
- Email API
- Import Set API
- Performance Analytics API
- Service Catalog API
- ▼ Table API
  - GET /now/table/{tableName}
  - POST /now/table/{tableName}
  - GET /now/table/{tableName}/{sys_id}
  - PUT /now/table/{tableName}/{sys_id}
  - PATCH /now/table/{tableName}/{sys_id}
  - DELETE /now/table/{tableName}/{sys_id}
- User Role Inheritance API Example — cURL | Python — KINGSTON
Request 400b / 443

| TableName | Name Of The Table From Which To Retrieve The Records. |
| Vertical ▾ | Vertical ▾ Parameter ▾ Description ▾ GO |
| Parameter ▾ | |
| Name ▾ GO | |

534 — sysparm_query

Encoded Query Used To Filter The Result Set.

root_paths_{root_paths_endpoint}_{root_paths_endpoint_httpverb}_parameter[2]_name

[child field] ▾ GO (sysparm_query=caller_id=javascript:gs.getUserID()^active=true)

The Encoded Query Supports Order By. To Sort Responses Based On Certain Fields, Use The ORDERBY And ORDERBYDESC Clauses In sysparm_query. For Example, sysparm_query=active=true^ORDERBYnumber^ORDERBYDESCcategory Filters All Active Records And Orders The Results In Ascending Order By Number First, And Then In Descending Order By Category.

If Part Of The Query Is Invalid, Such As By Specifying An Invalid Field Name, The Instance Ignores The Invalid Part. It Then Returns Rows Using Only The Valid Portion Of The Query. You Can Control This Behavior Using The Property glide.invalid_query.returns_no_rows. Set This Property To True To Return No Rows On An Invalid Query.

Note: This Property Controls The Behavior Of All Queries Across The Instance, Such As In Lists, Scripts (GlideRecord.query()), And Web Service APIs.

[type] ▾ [field] ▾ [child field] ▾ GO sysparm_display_

Data Retrieval Operation For Reference And Choice Fields.

*FIG. 5B*

APPLICATION PROGRAMMING INTERFACE DOCUMENTATION ANNOTATION

FIELD

The embodiments discussed in the present disclosure are related to application programming interface specification annotation.

BACKGROUND

Software applications may be built using one or more application programming interfaces (API or APIs), each of which is a set of routines, protocols, and tools. API specifications specify how other software components interact with the API based on its definition. The API specifications may utilize multiple different text files, formats, or configurations for storing data and information regarding the APIs. Machine learning systems may be used to gather the data and information included in the APIs in the different formats and to generate consolidated API specifications that are uniformly formatted. However, the machine learning systems may incorrectly identify objects in the API specifications or extract invalid information. The incorrectly identified objects or invalid information may cause errors when the software components interact with the APIs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method. The method may include receiving user input. The user input may be indicative of a style configuration for one or more application programming interface (API) specification formats. The method may also include generating a style file. The style file may include data representative of the style configurations indicated in the user input. Additionally, the method may include receiving an API specification. The API specification may include multiple API objects. Furthermore, the method may include determining an API specification format of the API specification. Responsive to the API specification format of the API specification satisfying a similarity threshold with respect to at least one API specification format of the one or more API specification formats, the method may include generating a temporary file. The temporary file may include data representative of the API specification. The method may also include generating a display file. The display file may include data based on the style file and the temporary file. In addition, the display file may be generated to include at least a portion of the style file and at least a portion of the temporary file. Additionally, the method may include directing display, on a display screen, of a graphical user interface (GUI) that displays the API specification based on the display file. Each API object of the multiple API objects may be displayed via the GUI to include formatting according to the style configuration indicated in the user input.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIGS. 4A-4B illustrate screen shots of the GUI displaying an example consolidated API specification that may be implemented in the computing device of FIG. 1;

FIGS. 5A-5B illustrate screen shots of the GUI displaying selection fields for annotating an example consolidated API specification that may be implemented in the computing device of FIG. 1;

DESCRIPTION OF EMBODIMENTS

Figure 1:
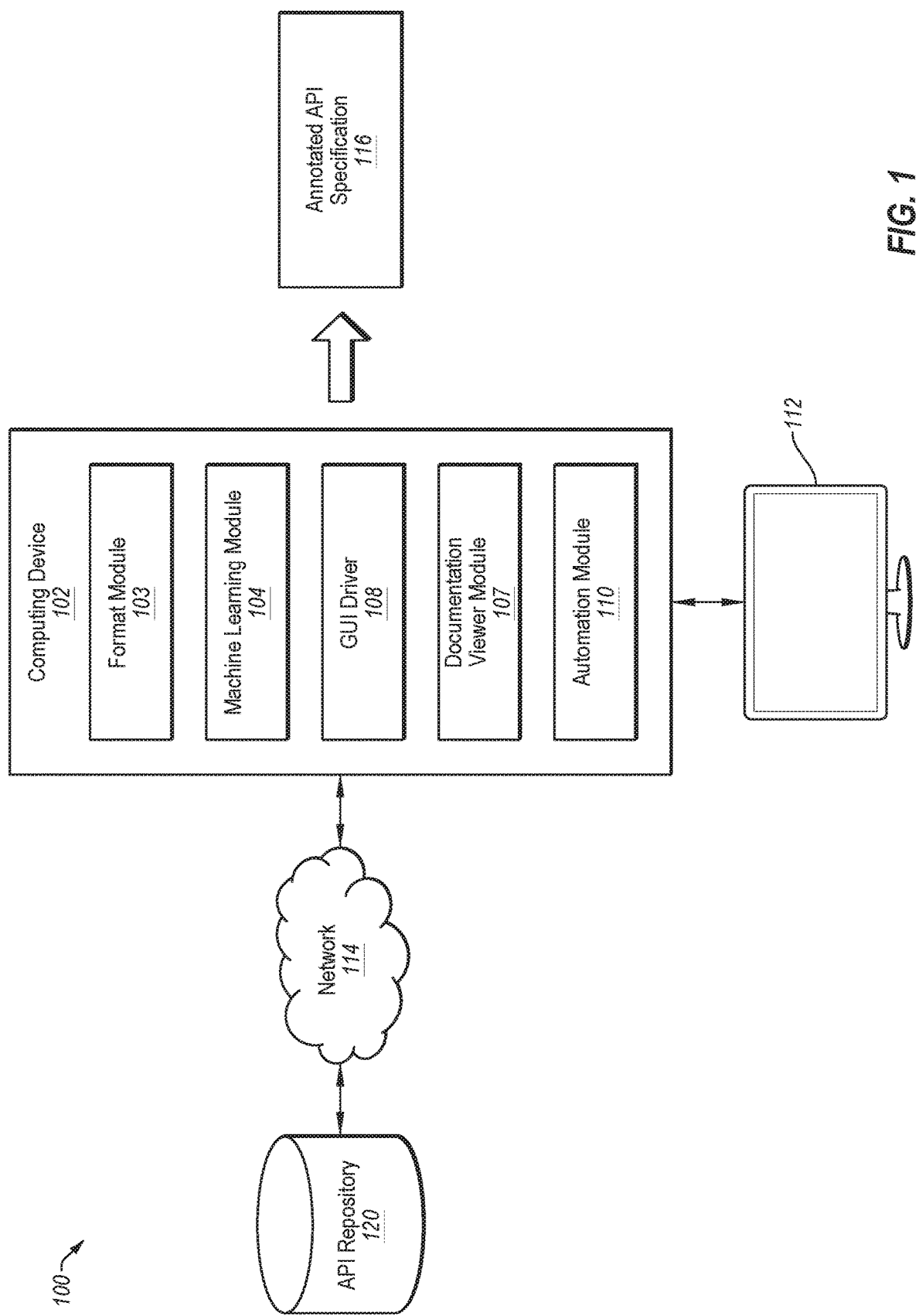
FIG. 1 illustrates an example operating environment in which consolidated API specification annotation techniques may be implemented.

Each year the number of application programming interfaces (APIs) increases along with the number of API specifications describing the APIs. In addition, different API specifications may be generated for the same APIs that describe how software components interact with the APIs using different formats. For example, the API specifications may include variations in API object labelling or other differences. As another example, optional information may be added to different API specifications (e.g., "x-privacy" to describe privacy of an API), API object labels, or API parameter labels within the API specifications.

Machine learning (ML) systems may be used to extract information, including API objects, from API specifications. In addition, the ML systems may generate a consolidated API specification for an API that is uniformly formatted. For example, the ML systems may extract API endpoints, hypertext transfer protocol (HTTP) verb functions, API attributes including parameters and responses, or any other appropriate information from API specifications. Further, in some embodiments, the ML systems may generate the consolidated API specification for an API according to an open API specification (OAS) format. In some embodiments, the ML systems may extract invalid information from the API specifications. For example, the ML systems may extract an invalid label of an API object. The invalid information extracted by the ML systems may cause the consolidated API specification to also include invalid information.

Some ML systems may perform operations to verify extracted information. For example, some ML systems may verify extracted API objects or related information by calling the associated API using the extracted API objects or related information. In some embodiments, the API, in response to the call by the ML systems using the extracted API objects or related information, may provide an expected or correct response, but the consolidated API specifications may still include invalid information. For example, an API may provide an expected or correct response to a call by the ML systems that includes an incorrectly extracted parameter name.

Some technologies for annotating or correcting invalid information may permit a user to annotate the invalid information in the consolidated API specification. However, these technologies may not be capable of providing feedback to the ML systems to update or improve a ML algorithm. In addition, some technologies may display the consolidated API specifications without any additional formatting and/or information regarding the API objects, labels, related information, or any combination thereof. These technologies may limit their use to users that are familiar with particular APIs or API specifications. For example, users reviewing and annotating consolidated API specifications without additional formatting and/or information may limit the use of these technologies to users that are familiar with specific terms in the consolidated API specifications or the specific associated APIs.

According to various embodiments described in this disclosure, a graphical user interface (GUI) displayed on a display screen may display a consolidated API specification according to formatting indicated by user input. In addition, the GUI displayed on the display screen may guide the user through the steps of annotating the consolidated API specification and providing feedback to ML systems. Likewise, the GUI displayed on the display screen may guide the user through the steps of generating annotation profiles to automate annotation of related consolidated API specifications.

In some embodiments, user input indicative of a style configuration for API specification formats may be received. In some embodiments, the user input may indicate types of formatting for displaying different types of API objects or other information included in the consolidated API specification. For example, the user input may indicate that a first API object type is to be displayed with green highlighting of associated text and a second API object type is to be displayed with yellow highlighting of associated text.

In some embodiments, a style file may be generated. The style file may include data representative of the style configurations indicated in the user input. In addition, the consolidated API specification may be received. An API specification format of the consolidated API specification may be determined. If the API specification format of the consolidated API specification satisfies a similarity threshold for at least one API specification format in the user input, a temporary file may be generated. The temporary file may include data representative of the API specification. In addition, a display file may be generated. The display file may include data based on the style file and the temporary file. For example, in some embodiments, the display file may include at least a portion of the style file and at least a portion of the temporary file. In some embodiments, the GUI may be displayed on a display screen. The GUI may display the consolidated API specification based on the display file. For example, API objects in the consolidated API specification may be displayed to include formatting according to the style configurations.

Alternatively, in some embodiments, if the API specification format of the consolidated API specification does not satisfy the similarity threshold for at least one API specification format in the user input, the GUI may display, on the display screen, a request for additional user input indicating a style configuration for the API specification format of the consolidated API specification.

A potential benefit of the embodiments described in the present disclosure may include reliable generation of consolidated API specifications based on information extracted from multiple API specifications. Another potential benefit of the embodiments described in the present disclosure may include permitting users that are not familiar with a specific API or a specific API format to annotate consolidated API specifications. Likewise, a potential benefit of the embodiments described herein may include automation of annotation of related consolidated API specifications.

These and other embodiments of the present disclosure will be explained with reference to the accompanying figures. In the figures, features with like numbers indicate like structure and function unless described otherwise.

FIG. 1 illustrates an example operating environment 100 in which consolidated API specification annotation techniques may be implemented. The operating environment 100 may include a computing device 102, which may be configured to perform the API specification annotation techniques. The operating environment 100 may also include a display screen 112, a network 114, and an API repository 120.

The computing device 102 may include a format module 103, a machine learning module 104 ("ML module 104"), a specification viewer module 107, a GUI driver 108, and an automation module 110. The format module 103, ML module 104, specification viewer module 107, GUI driver 108, and automation module 110 may be configured to implement steps and processes associated with a web annotation tool API (WATAPI) to annotate a consolidated API specification as discussed in more detail below. The computing device 102, the API repository 120, or some combination thereof may communicate information and data via the network 114. The computing device 102 and the API repository 120 are briefly described below.

The network 114 may include any communication network configured for communication of signals between any of the components (e.g., 102 and 120) of the operating environment 100. The network 114 may be wired or wireless. The network 114 may have numerous configurations including a star configuration, a token ring configuration, or another suitable configuration. Furthermore, the network 114 may include a local area network (LAN), a wide area network (WAN) (e.g., the Internet), and/or other interconnected data paths across which multiple devices may communicate. In some embodiments, the network 114 may include a peer-to-peer network. The network 114 may also be coupled to or include portions of a telecommunications network that may enable communication of data in a variety of different communication protocols.

In some embodiments, the network 114 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 114 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the computing device 102 and the API repository 120.

The display screen 112 may display a GUI to the user to guide the user through the process to generate an annotated API specification 116. The GUI displayed on the display screen 112 may permit the user to load, filter, view, and annotate API objects; API specifications; or any other appropriate text contained within an API specification. Additionally, the GUI displayed on the display screen 112 may permit the user to parse different APIs and API specification pages. The GUI may be displayed on the display screen 112 through a web browser or an application that is native to the computing device 102.

The API repository 120 may include any memory or data storage, which may be similar to a memory 652 discussed below in relation to FIG. 6. The API repository 120 may include network communication capabilities such that other components in the operating environment 100 (e.g., 102) may communicate with the API repository 120. The API repository 120 may include any computer-based or hardware-based computing system. The API repository 120 may include a system or device with which API specifications are configured to be stored. The API repository 120 may include API specifications that describe APIs.

The computing device 102 may include a computer-based hardware device that includes a processor, memory, and communication capabilities. The computing device 102 may be coupled to the network 114 to communicate data with other components of the operating environment 100 (e.g., 120). Some examples of the computing device 102 may include a smartphone, a tablet computer, a laptop computer, a desktop computer, etc. The computing device 102 may include a processor-based computing device. For example, the computing device 102 may include a hardware server or another processor-based computing device configured to function as a server.

The ML module 104 may be configured to access or receive API specifications from the API repository 120. In some embodiments, the ML module 104 may include code and routines configured to enable a computing system (e.g., the computing device 102) to perform one or more operations to access or receive the API specifications. Additionally or alternatively, the ML module 104 may be implemented using hardware including a processor, a microprocessor (e.g., to perform or control performance of one or more operations), a field-programmable gate array (FPGA), or an application-specific integrated circuit (ASIC). In some other instances, the ML module 104 may be implemented using a combination of hardware and software. In the present disclosure, operations described as being performed by the ML module 104 may include operations that the ML module 104 may direct a system (e.g., the computing device 102) to perform.

The API specifications may describe similar APIs using different formats. In some embodiments, the ML module 104 may extract information from the API specifications. For example, the ML module 104 may extract API objects, API parameters, API criteria, API endpoints, API verb functions, API attributes including parameters and responses, or some combination thereof. The ML module 104 may use the API objects, API parameters, API criteria, API endpoints, API verb functions, and API attributes to consolidate the API specifications into the consolidated API specification.

Example code that may be extracted by the ML module 104 may include:

```
Paths: {
- /users/{username}/favorites: {
- get: {
- responses:{
- 200: {
description: "shows user's favorite packages"
}
},
description: "shows user's favorite packages",
- parameters: [
- {
required: true,
type: "string",
description: "username",
in: "path",
name: "username"
},
```

In the example code, the text "/users/{username}/favorites" may include the path of an API object associated with the example code. Likewise, the text "required: true, type: 'string', description: 'username', in: 'path', name: 'username'" in the example code may be the API parameters of the API object. Further, in the example code, the text "get: {-responses: {-200: {" may represent the API object type.

In some embodiments, the ML module 104 may extract the information and generate the consolidated API specification as described in U.S. patent application Ser. No. 15/374,798, which is incorporated in the present disclosure in its entirety.

In addition, in some embodiments, the consolidated API specification may include hypertext markup language (HTML) tables that are associated with the API objects. The HTML tables may include HTML table tags that define attributes of the API objects. For example, the HTML table tags may define parameters, repossess, API endpoints, or some combination thereof.

An example consolidated API specification may include:

```
BEG::responses:table
Error Code
400
401
403
404
409
429
500
503
END::responses:table
```

In the example consolidated API specification, "BEG:: responses: table" and "END:: responses: table" may be identified as API objects and "404 Not Found—The specified endpoint could not be found" may be identified as hypertext markup table language (HTML) table content.

In some embodiments, the ML module 104 may extract invalid information from the API specifications and generate the consolidated API specification such that the consolidated API specification also includes invalid information. The invalid information in the consolidated API specification may cause software components that are developed using the consolidated API specification to operate incorrectly.

Example invalid information (discussed in the present disclosure as the "GET object example") that may be included in the consolidated API specification may include:
  GET /now/table/{table
The example invalid information may include incomplete text associated with an API object. In some embodiments, the format module 103, GUI driver 108, specification viewer module 107, automation module 110, or some combination thereof may be configured to annotate the consolidated API specification based on user input received via the GUI on the display screen 112 as discussed in more detail below.

In some embodiments, the format module 103 may receive user input indicative of a style configuration for displaying the consolidated API specification via the GUI on the display screen 112. In some embodiments, the format module 103 may include code and routines configured to enable a computing system (e.g., the computing device 102) to perform one or more operations to receive user input indicative of the style configuration. Additionally or alternatively, the format module 103 may be implemented using hardware including a processor, a microprocessor (e.g., to perform or control performance of one or more operations), a field-programmable gate array (FPGA), or an application-specific integrated circuit (ASIC). In some other instances, the format module 103 may be implemented using a combination of hardware and software. In the present disclosure, operations described as being performed by the format module 103 may include operations that the format module 103 may direct a system (e.g., the computing device 102) to perform.

The user input may indicate the style configurations for different API specification formats. For example, the user input may indicate the style configurations for OAS 1.0, OAS, 2.0, OAS 3.0, or some combination thereof. In addition, the style configurations may indicate formatting to be associated with different API object definitions.

The style configurations may indicate shading, bordering, highlighting, font, or any other appropriate type of formatting for displaying API objects via the GUI on the display screen 112. The format module 103 may generate a style file for applying the style configurations to the API objects in the consolidated API specification. For example, the style file may include a list of API object definitions and associated formatting for each of the API object definitions. In some embodiments, the style file may record the style configurations in cascading style sheets (CSS) code. In these and other embodiments, the style file may be labelled "WATAPI.css." An example style file may include:

---

{
"schemes": "0000FF,[ ],/oasschemes",
"host": "",
"basePath": "",
"info": {
"title": ""<
"version": "",
"description": "",
}
"securityDefinitions": {
"basicAuthenticationSecurity": "",
"apiKeySecutiry": "",
"oauth2ImplicitSecurity": ::,
"oauth2PasswordSecurity": "",
"oauth2ApplicationSecurity": "",
"oauth2AccessCodeSecurity": "",
},

---

In the example style file, the text "schemes" may be an API object definition and the text "#0000FF, [ ],/oas/ schemes" may represent a format style according to CSS code. In some embodiments, the style file may be updated based on additional user input. For example, the style file may be updated to include additional API object definitions, format styles, or some combination thereof.

In some embodiments, the user input indicative of the style configurations may be received and the style file may be generated by the format module 103 prior to the ML module 104 generating the consolidated API specification. In other embodiments, the format module 103 may request the user to provide the user input indicative of the style configurations responsive to the consolidated API specification being generated by the ML module 104.

The GUI driver 108 may receive the consolidated API specification and the style file. In some embodiments, the GUI driver 108 may determine the API specification format of the consolidated API specification. For example, the GUI driver 108 may determine whether the consolidated API specification format is OAS 1.0, OAS 2.0, OAS 3.0, or any other appropriate API specification format. In some embodiments, the API specification format of the consolidated API specification may be determined by the format module 103 and included in the request to the user to provide the user input indicative of the style configuration.

In some embodiments, the GUI driver 108 may include code and routines configured to enable a computing system (e.g., the computing device 102) to perform one or more operations to receive the consolidated API specification and the style file and to determine the API specification format of the consolidated API specification. Additionally or alternatively, the GUI driver 108 may be implemented using hardware including a processor, a microprocessor (e.g., to perform or control performance of one or more operations), a field-programmable gate array (FPGA), or an application-specific integrated circuit (ASIC). In some other instances, the GUI driver 108 may be implemented using a combination of hardware and software. In the present disclosure, operations described as being performed by the GUI driver 108 may include operations that the GUI driver 108 may direct a system (e.g., the computing device 102) to perform.

In some embodiments, the GUI driver 108 may determine whether the API specification format of the consolidated API specification satisfies a similarity threshold with respect to the API specification formats of the style file . . . . In other embodiments, the GUI driver 108 may determine whether the API specification format of the consolidated API specification satisfies the similarity threshold with respect to the API specification format based on a title of the consolidated API specification being in a format that is the same as or similar to a format that is associated with the API specification formats of the style file.

Responsive to the API specification format of the consolidated API specification satisfying the similarity threshold, the GUI driver 108 may generate a temporary file. The temporary file may include data representative of at least a portion of the consolidated API specification. In some embodiments, the temporary file may include a list of the API objects included in the consolidated API specification. In some embodiments, the temporary file may record the data representative of the consolidated API specification in HTML code. In these and other embodiments, the temporary file may be labelled WATAPI.HTML.

The GUI driver 108 may also generate a display file. The display file may be generated based on the style file and the temporary file. In some embodiments, the display file may be generated so as to include at least a portion of the style file, the temporary file, or some combination thereof. The display file may cause the API objects of the consolidated API specification to be displayed via the GUI on the display screen 112 in a tree view.

Additionally, the display file may cause the API objects of the consolidated API specification to be displayed via the GUI on the display screen 112 according to the style configurations. For example, if the style file indicates that API objects of a first API object type (e.g., a first API definition) are to be displayed with yellow highlighting, any API object in the consolidated API specification may be displayed via the GUI on the display screen 112 with associated text highlighted yellow. Therefore, the display file may permit the user to view and annotate the information contained within the consolidated API specification via the GUI displayed on the display screen 112. In some embodiments, the display file may be generated according to python programming language. In these and other embodiments, the display file may be labelled WATAPI.py.

Figure 3A:
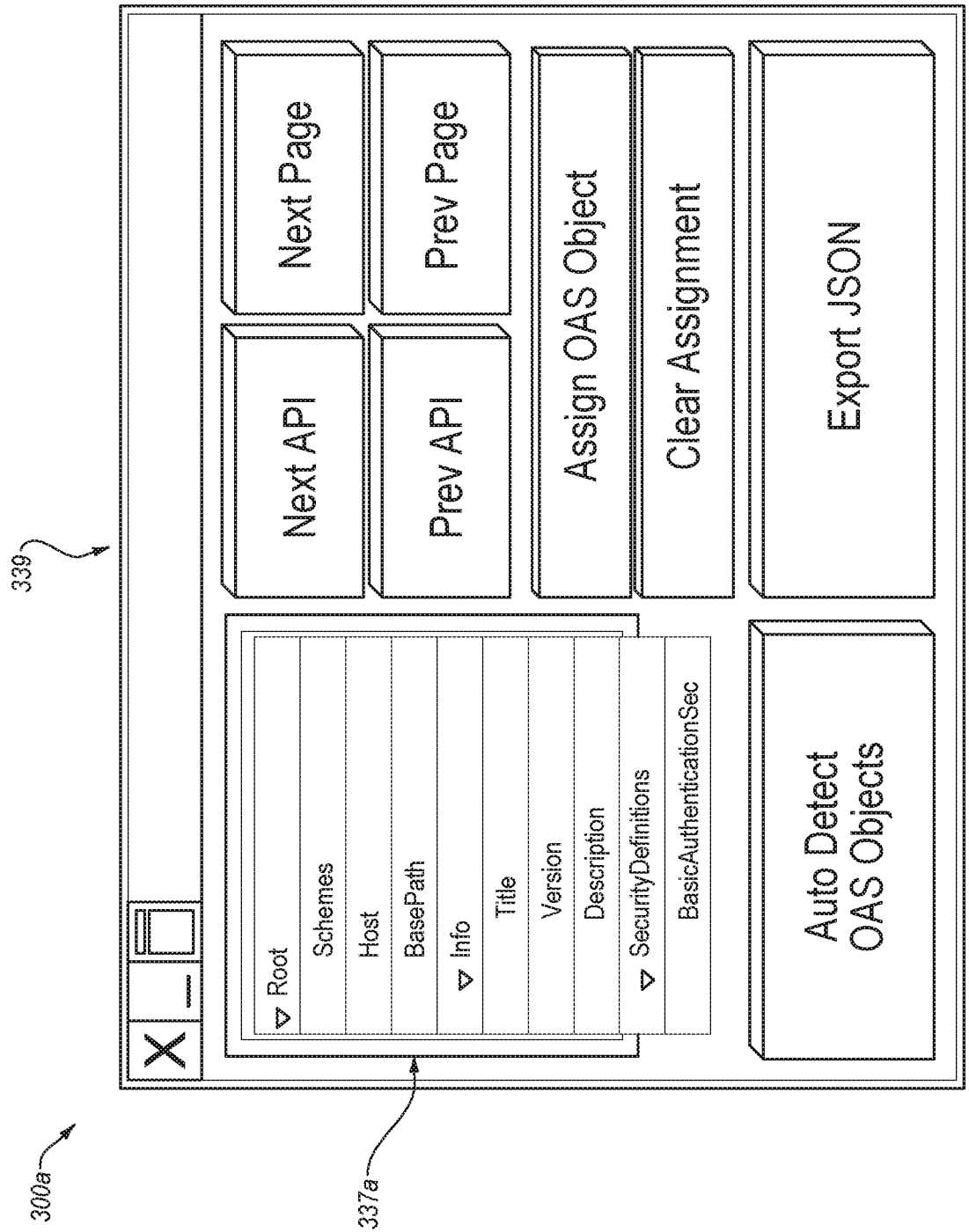
FIG. 3 illustrates a screen shot of a graphical user interface (GUI) that includes selection buttons and a Tree View of an example consolidated API specification that may be implemented in the computing device of FIG. 1.
Figure 3B:
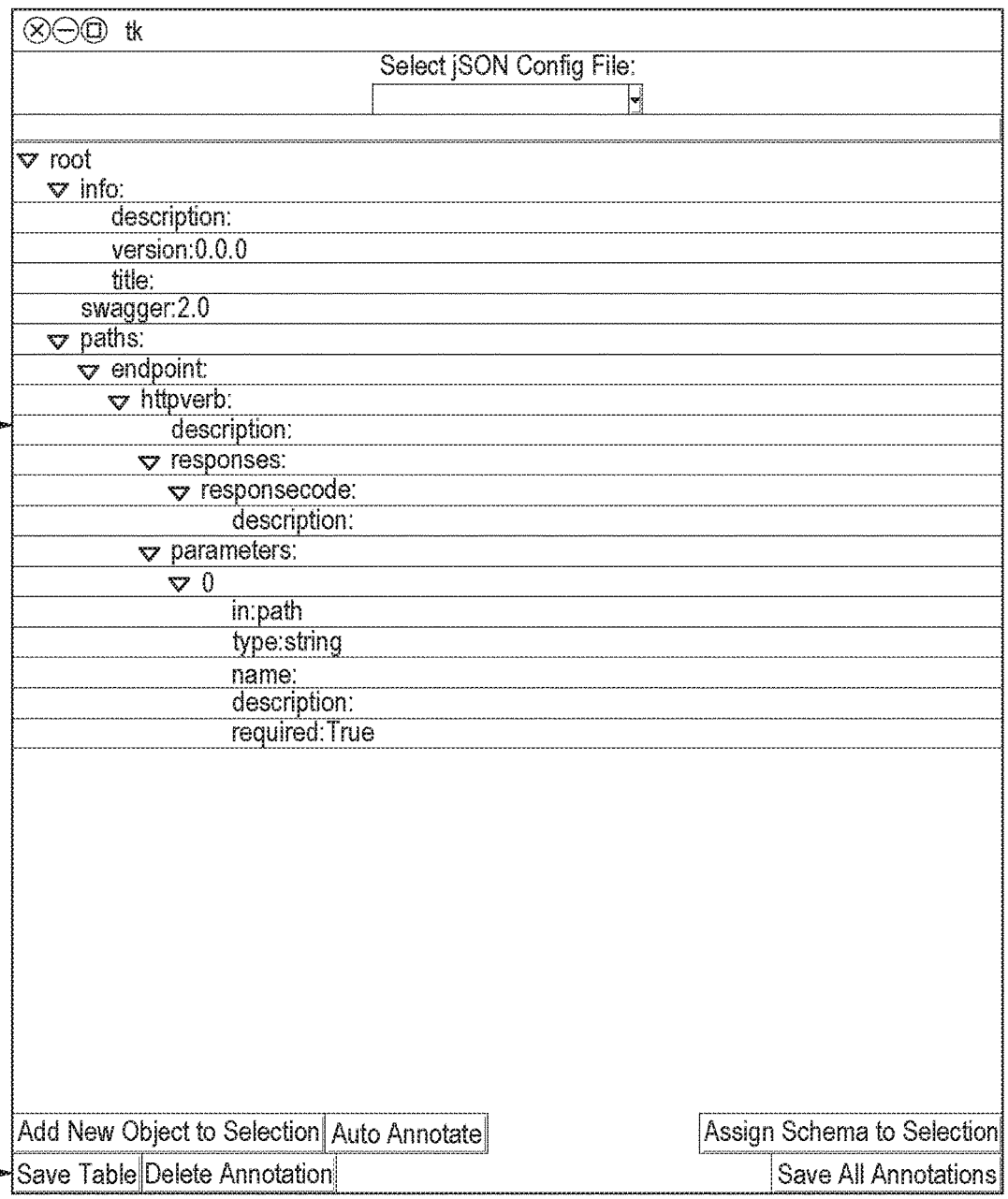

The GUI displayed on the display screen 112 may include multiple windows that permit the user to browse different APIs, API specifications, pages of API specifications, or some combination thereof. Referring to FIG. 3, an illustrated screen shot 300 illustrates the GUI including selection buttons 339 and a Tree View 337 of API objects of an example consolidated API specification that may be implemented in the computing device 102 of FIG. 1. As illustrated in FIG. 3, the selection buttons 339 may include a "Next API" button, a "Prev API" button, a "Next Page" button, a "Prev Page" button, an "Assign OAS Object" button, an "Export JSON" button, a "Clear Assignment" button, and an "Auto Detect OAS Objects" button.

The "Next API" button may be configured to be selected by the user to view a consolidated API specification associated with a different API. The "Prev API" button may be configured to be selected by the user to view a consolidated API specification associated with an API that was previously viewed. The "Next API Page" button may be configured to be selected by the user to view subsequent pages of the example consolidated API specification. The "Prev API Page" button may be configured to be selected by the user to view previous pages of the example consolidated API specification. The "Assign OAS Object" button may be configured to be selected by the user to assign API objects of the example consolidated API specification to the content of the selenium browser. The "Export JSON" button may be configured to be selected by the user to save annotations that have been made to the example consolidated API specification or to the formatting of the API objects included in the example consolidated API specification. The "Clear Assignment" button may be configured to be selected by the user to . . . The "Auto Detect OAS Objects" button may be configured to be selected by the user to retrieve, load, and view consolidated API specifications via the GUI and to annotate consolidated API specifications if they are related to consolidated API specifications that have previously been annotated as discussed in more detail below. The Tree View 337 may include a list of the API objects included in the example consolidated API specification that are currently being viewed. The Tree View 337 may display the API objects formatted according to the style configurations.

Referring back to FIG. 1, the GUI driver 108 may provide the temporary file to the specification viewer module 107. The specification viewer module 107 may display the entire consolidated API specification on the display screen 112 using the temporary file. In some embodiments, the specification viewer module 107 may include code and routines configured to enable a computing system (e.g., the computing device 102) to perform one or more operations to display the entire consolidated API specification on the display screen 112 using the temporary file. Additionally or alternatively, the specification viewer module 107 may be implemented using hardware including a processor, a microprocessor (e.g., to perform or control performance of one or more operations), a field-programmable gate array (FPGA), or an application-specific integrated circuit (ASIC). In some other instances, the specification viewer module 107 may be implemented using a combination of hardware and software. In the present disclosure, operations described as being performed by the specification viewer module 107 may include operations that the specification viewer module 107 may direct a system (e.g., the computing device 102) to perform.

In some embodiments, the specification viewer module 107 may display the entire consolidated API specification in the same window as the selection buttons 339 and the Tree View 337. In other embodiments, the specification viewer module 107 may display the entire consolidated API specification in a different window from the selection buttons 339 and the Tree View 337. In addition, the specification viewer module 107 may display each of the API objects in the consolidated API specification formatted according to the style configurations.

Figure 4A:
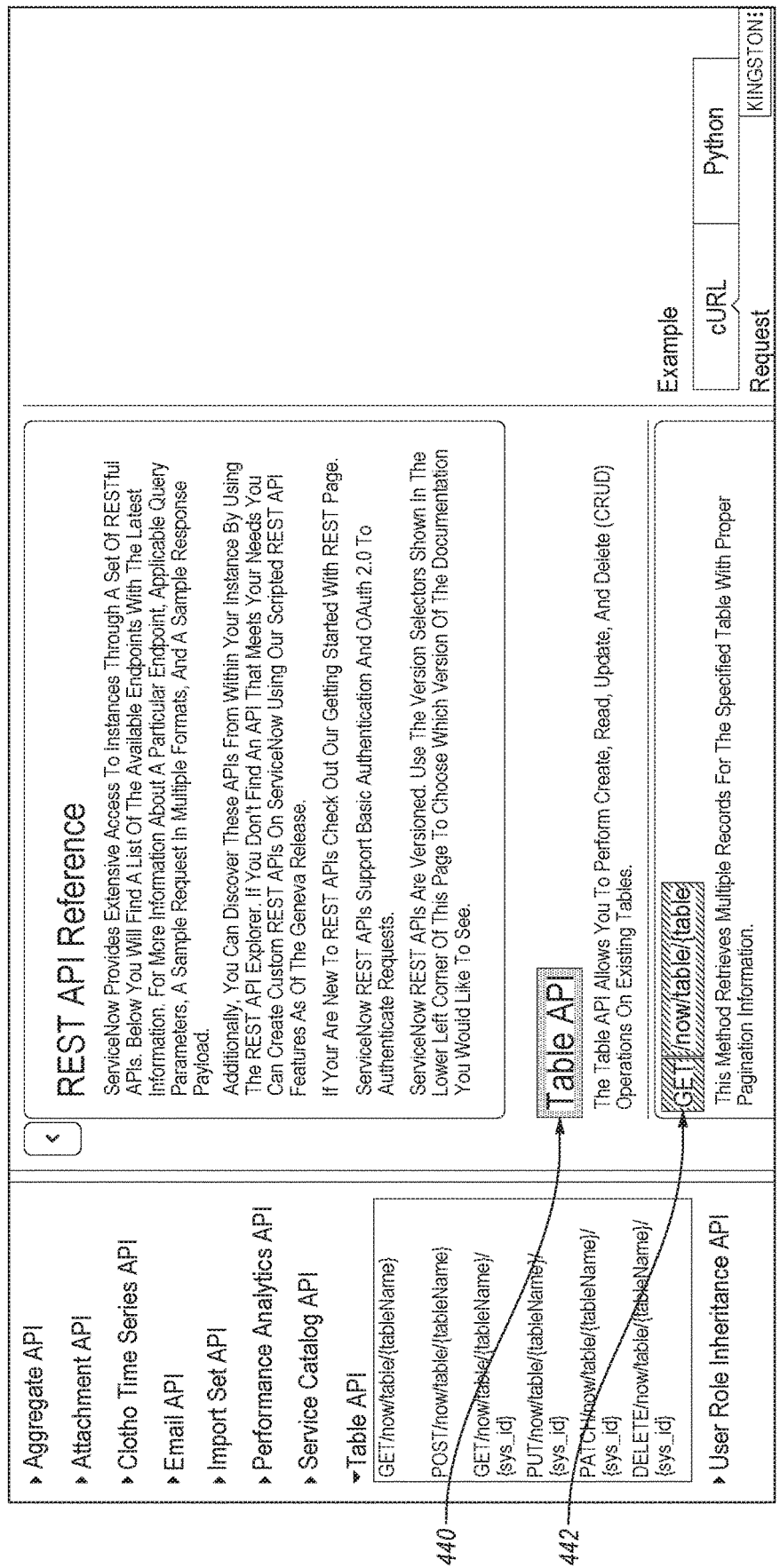

Referring to FIG. 4A, an illustrated screen shot 400a illustrates the GUI displaying an example consolidated API specification in a different window from the selection buttons 339 and the Tree View 337. The example consolidated API specification may include invalid information 442 and valid information 440. The valid information 440 may include valid text associated with an API object. As illustrated in FIG. 4A, the valid information 440 may include "Table API" and may be formatted to include HASH MARK TYPE. The invalid information 442 may include invalid text associated with an API object. As illustrated in FIG. 4A, the invalid information 442 may include "GET /now/table/{table" and may be formatted to include HASH MARK TYPE. The invalid information 442 illustrated in FIG. 4A corresponds to the GET object example discussed in the present disclosure.

Referring back to FIG. 1, the GUI driver 108 may be configured to receive user input indicative of annotations to be made to the consolidated API specification. For example, the user may select API objects from the Tree View 337 and may annotate text that is associated with the API objects (e.g., the user may add text, remove text, or both to text that is associated with the API objects) via the GUI displayed on the display screen 112. As another example, the user may add API objects to the consolidated API specifications via the GUI displayed on the display screen 112.

In some embodiments, the user may select API objects and assign HTML table tags to the API objects via the GUI displayed on the display screen 112. For example, the GUI may include selection fields for each cell of an HTML table. The user may select an API object and to associate that API object with rows, columns, or both of HTML tables using the selection fields. For example, the user may select a first column of an HTML table as a parameter name and a second column of the same HTML table as a parameter description. As another example, the user may deselect one or more cells in an HTML table from being associated with API objects.

Figure 5A:
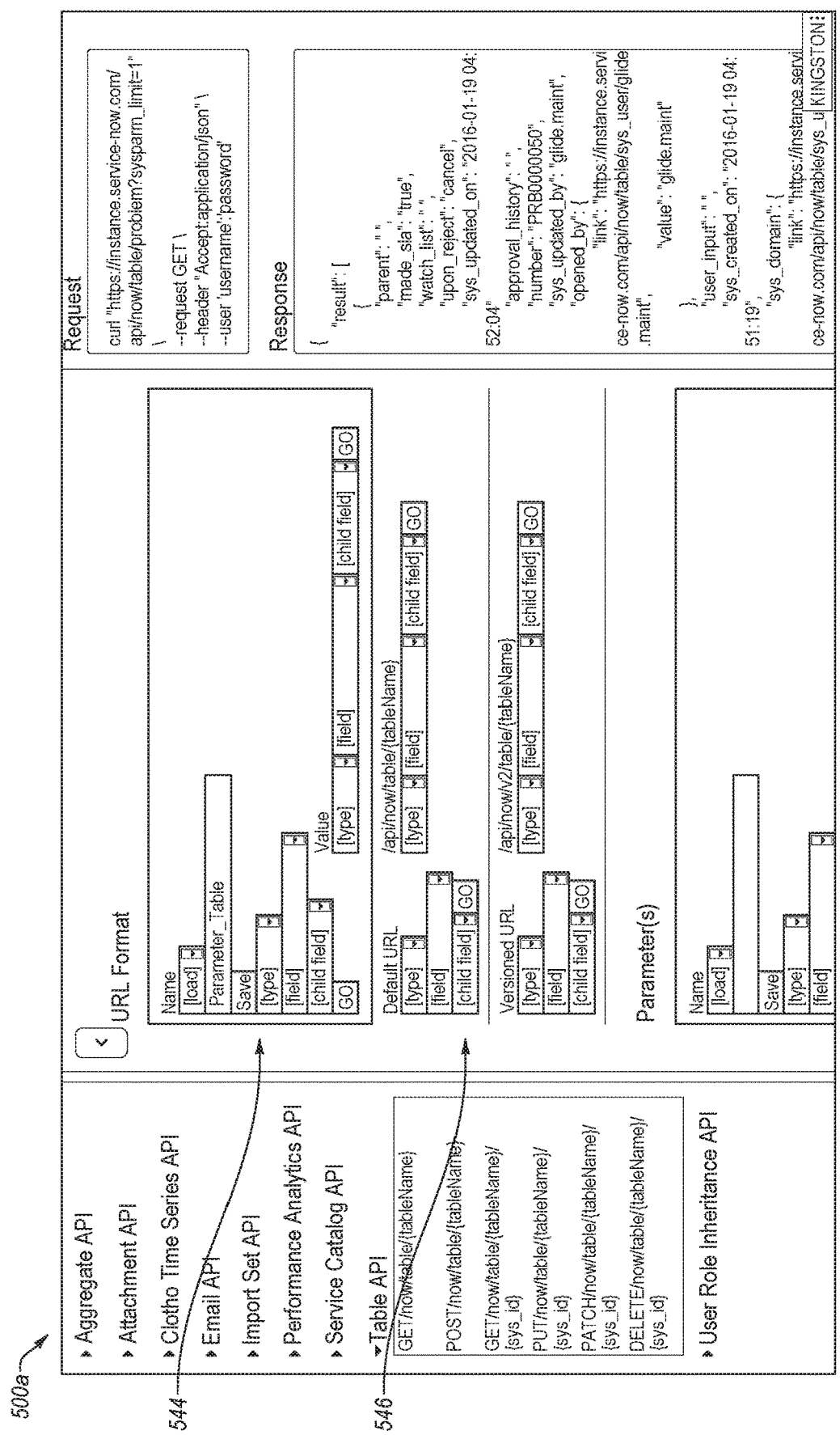

Referring to FIGS. 5A-5B, illustrated screen shots 500a-b illustrate the GUI displaying selection fields for annotating an example consolidated API specification that may be implemented in the computing device 102 of FIG. 1. As illustrated in FIG. 5A, the GUI may include HTML table action and save action fields 544 and applied table action fields 546. Additionally, as illustrated in FIG. 5B, the GUI may display an embedded tooltip 534. The embedded tooltip 534 may display the annotation of a currently selected API object. Likewise, as illustrated in FIG. 5B, the user may select the first column of an HTML table as a parameter name and the second column of an HTML table as a parameter description to associate with an API object.

Referring back to FIG. 1, the GUI driver 108 may generate an injection file. The injection file may include data representative of functions that are to be injected into the temporary file (e.g., injected data representative of the functions that are to be injected into the data representative of the consolidated API specification). For example, the injection file may include code for adding additional API objects to the consolidated API specification. In some embodiments, the injection file may record the functions to be injected in JavaScript (JS) code. In these and other embodiments, the injection file may be labelled WATAPI.js.

In addition, the GUI driver 108 may generate an application file. The application file may include data representative of functions to be applied to the temporary file (e.g., code for annotating the data representative of the consolidated API specification). For example, the functions may annotate data representative of API objects in the consolidated API specification. In some embodiments, the application file may record the functions to be applied in Perl (PL) code. In these and other embodiments, the application file may be labelled WATAPI.pl. An example function that may be included in the application file may include:

schema_treeview.insert('root', 'end',
  'root_definitions',text='definitions:',tags=('root_definitions'))
schema_treeview.tag configure('root_definitions', background='white')

In the example function, the text "'root', 'end', and 'root_definitions'" may include the path of the function to be applied to the temporary file, the text "text='definitions': may include the text of the function to be applied to the temporary file, the text "tags=(root_definitions'))" may include the HTML table tag and corresponding value to be applied to the temporary file, and the text "background='white'" may include the formatting to be applied to associated API objects in the temporary file.

In addition, the GUI driver 108 may update the display file (e.g., generate an updated display file) based on the annotations to the consolidated API specification. For example, the display file may be updated based on the temporary file after the functions have been injected, applied, or both to the temporary file. For example, if an API object was added to the consolidated API specification, the GUI may display each of the API objects, including the API object that was added, in the Tree View 337.

In some embodiments, the GUI driver 108 may provide the temporary file after the functions have been injected, applied, or both to the specification viewer module 107. The specification viewer module 107 may display the entire consolidated API specification including the annotations to the consolidated API specification via the GUI on the display screen 112.

Referring to FIG. 4B, an illustrated screen shot 400b illustrates the GUI displaying an example consolidated API specification including annotations. In addition, the example consolidated API specification is being displayed according to the style configurations. As illustrated in FIG. 4B, some of the injected or applied functions are visible (e.g., updates to formatting or addition of text in the example consolidated API specification) and some of the injected or applied functions are not visible (e.g., updates to HTML tags that are associated with the API objects).

The example consolidated API specification illustrated in FIG. 4B may include updated information 443. The updated information 443 may include text that has been annotated via the GUI on the display screen 112 to include valid text for the associated API object. As illustrated in FIG. 4B, the updated information 443 may include "GET /now/table/{tableName}" and may be formatted to include HASH MARK TYPE. The updated information 443 displayed in the screen shot 400b corresponds to the GET object example discussed in the present disclosure and includes the annotated text of "Name." In addition, the updated information 443 corresponds to the invalid information 442 illustrated in FIG. 4A. The updated information 443 may include the invalid information 442 and annotations based on user input received via the GUI on the display screen 112. For example, the invalid information 443, as illustrated in FIG. 4A, may include "GET /now/table/{table" and the updated information 443, as illustrated in FIG. 4B, may include "GET /now/table/{tableName}".

Referring back to FIG. 1, the specification viewer module 107 or the GUI driver 108 may generate the annotated API specification 116 based on the temporary file after the functions have been injected, applied, or both to the temporary file. The annotated API specification 116 may include the annotations that were made to the consolidated API specification by the user via the GUI displayed on the display screen 112.

In some embodiments, the automation module 110 may be configured to automatically apply annotations to related API objects in the consolidated API specification based on annotations previously made by the user. Additionally, in some embodiments, the automation module 110 may be configured to automatically apply annotations to related consolidated API specifications based on the annotations previously made by the user to the consolidated API specification.

In some embodiments, the automation module 110 may include code and routines configured to enable a computing system (e.g., the computing device 102) to perform one or more operations to automatically apply annotations to related API objects in the consolidated API specification or to automatically apply annotations to related consolidated API specifications. Additionally or alternatively, the automation module 110 may be implemented using hardware including a processor, a microprocessor (e.g., to perform or control performance of one or more operations), a field-programmable gate array (FPGA), or an application-specific integrated circuit (ASIC). In some other instances, the automation module 110 may be implemented using a combination of hardware and software. In the present disclosure, operations described as being performed by the automation module 110 may include operations that the automation module 110 may direct a system (e.g., the computing device 102) to perform.

For example, the annotations made to an HTML table associated with an API object on an API page of the consolidated API specification may be saved as an annotation configuration. The automation module 110 may apply the annotation configuration to related HTML tables on the same API page or to different API pages of the consolidated API specification. For example, the automation module 110 may automatically detect related API objects on the same API page or different API pages and apply the annotation configuration to the related API objects.

In some embodiments, the automation module 110 may identify related API objects based on HTML table headers. In some embodiments, the HTML table headers may be in a document object model (DOM) structure. The automation module 110 may identify the HTML table header of the API objects associated with the annotation configuration and each additional API object in the consolidated API specification. The automation module 110 may compare the HTML table header of the API objects that are associated with the annotation configuration to each additional API object in the consolidated API specification. If the table headers of an additional API object in the consolidated API specification and the API object associated with the annotation configuration are the same or similar, the additional API object may be a related API object and the automation module 110 may automatically apply the annotation configuration to the related API object.

In some embodiments, the automation module 110 may update the data representative of the related API object in the temporary file based on annotations made to the data representative of the API object associated with the annotation configuration. For example, the automation module 110 may inject the function or apply the function to the data representative of the related API object that was injected in or applied to the data representative of the API object associated with the annotation configuration in the temporary file.

In some embodiments, the automation module 110 may be configured to automatically apply annotations to related consolidated API specifications based on annotations previously made by the user to the consolidated API specification. In these and other embodiments, the automation module 110 may determine whether additional consolidated API specifications are related to the consolidated API specification. In some embodiments, the automation module 110 may receive user input via the GUI displayed on the display screen 112 indicating that an additional consolidated API specification is a related consolidated API specification. In some embodiments, the automation module 110 may determine whether the API specification format of the additional consolidated API specification is the same as or similar to the API specification format of the consolidated API specification. Alternatively, in some embodiments, the automation module 110 may compare . . . .

If an additional consolidated API specification is a related consolidated API specification, the automation module 110 may determine whether there are any API objects in the related consolidated API specification that are related API objects to the API objects that were annotated in the consolidated API specification as discussed above.

In some embodiments, the automation module 110 may generate a related style file, a related display file, a related application file, a related temporary file, and a related injection file for the related consolidated API specification as discussed above in relation to the consolidated API specification. In these and other embodiments, the automation module 110 may update data representative of related API objects in the related consolidated API specification in the related temporary file based on annotations made to the data representative of the API objects that were annotated in the consolidated API specification as discussed above.

In some embodiments, annotation configurations may be generated according to HTML code. In addition, in some embodiments, annotation configurations may be saved by the user via the GUI displayed on the display screen 112 as different versions. In addition, in some embodiments, the user may select different versions of the annotation configurations via the GUI displayed on the display screen 112.

In some embodiments, the GUI driver 108 may provide feedback to the ML module 104 based on annotations to the consolidated API specification made by the user. The ML module 104 may use the feedback to update ML algorithms for extracting information from API specifications. In some embodiments, the ML module 104 may update the ML algorithms based on the feedback provided by the GUI driver 108 to more accurately identify API objects based on associated API object definitions. In these and other embodiments, the ML module 104 updating the ML algorithms may reduce an amount of invalid information that is extracted from API specifications by the ML module 104. Reducing the amount of invalid information that is included consolidated API specifications may increase an overall accuracy of the ML module 104.

For example, in the GET object example, the ML algorithms of the ML module 104 may be updated to identify API object definitions of GET API objects as API objects that follow the format of "GET /now/table/{tableName}" instead of "GET /now/table/{table". Updating the ML algorithms so that GET API objects are identified as API objects that follow the format of "GET /now/table/{tableName}" may cause the ML module 104 to initially extract the updated information 443, as illustrated in FIG. 4B, instead of the invalid information 442, as illustrated in FIG. 4A, for the associated API object.

Modifications, additions, or omissions may be made to FIG. 1 without departing from the scope of the present disclosure. For example, the operating environment 100 may include more or fewer elements than those illustrated and described in the present disclosure. Moreover, although described separately, in some embodiments, two or more of the by the format module 103, the ML module 104, the GUI driver 108, the specification viewer module 107, and the automation module 110 may be part of a same system or module or divided differently than described. The delineation between these and other elements in the description is not limiting and is meant to aid in understanding and explanation of the concepts and principles used in the present disclosure.

For example, in some embodiments, the operations performed by the format module 103, the ML module 104, the GUI driver 108, the specification viewer module 107, and the automation module 110 may be performed by the different modules as discussed in relation to FIG. 1. In other embodiments, one or more of the operations performed by the format module 103, the ML module 104, the GUI driver 108, the specification viewer module 107, and the automation module 110 may be performed by a different module. For example, the style file, the display file, the application file, the temporary file, and the injection file may all be generated by the GUI driver 108 as discussed below in relation to FIG. 2. As another example, the GUI driver 108 may be configured to perform the automation steps discussed above in relation to the automation module 110.

Figure 2:
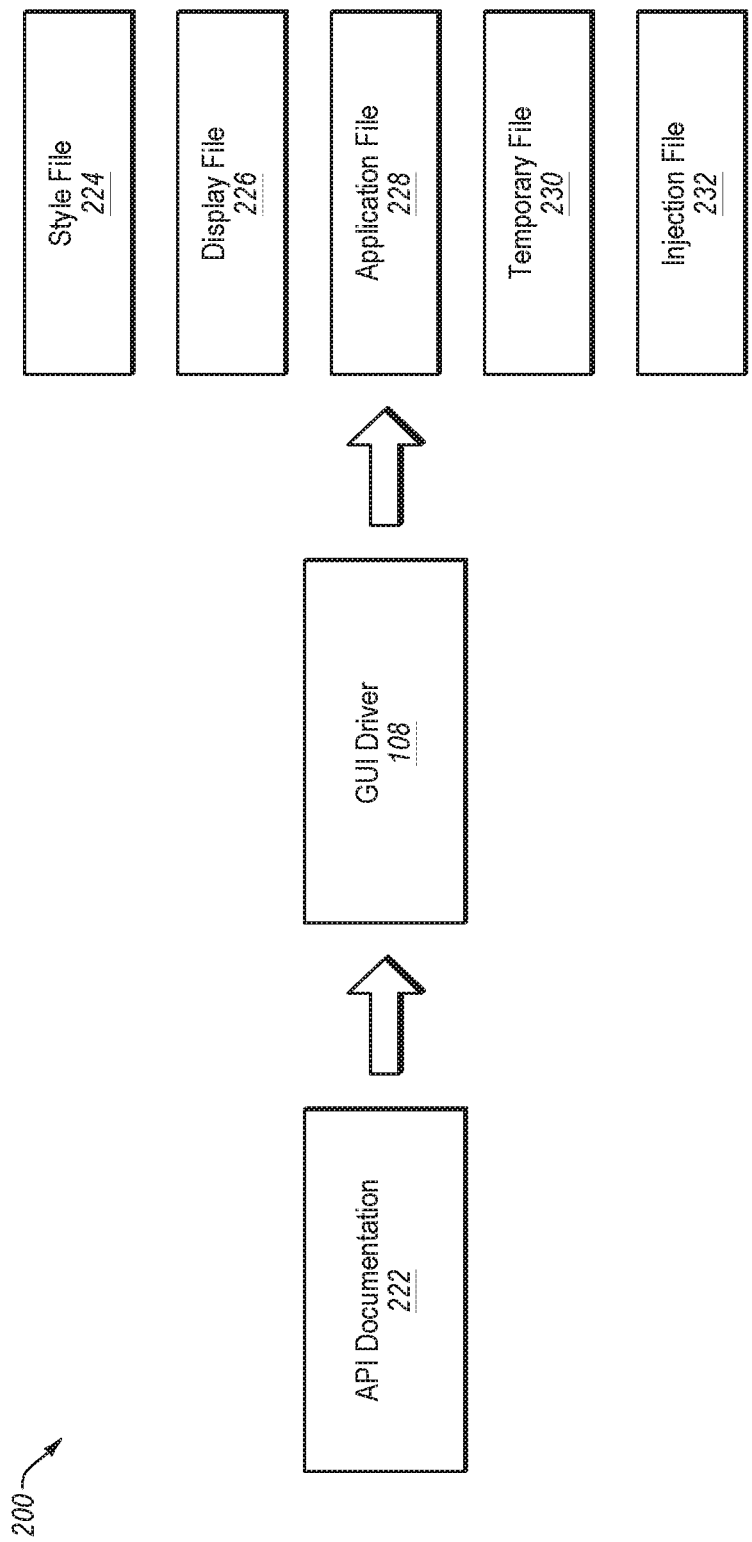
FIG. 2 illustrates a block diagram of a consolidated API specification annotation process that may be implemented in the operating environment of FIG. 1.

FIG. 2 illustrates a block diagram of a consolidated API specification annotation process 200 that may be implemented in the operating environment 100 of FIG. 1. The GUI driver may receive an API specification 222 as discussed above in relation to FIG. 1. In some embodiments, the API specification 222 may include a consolidated API specification that was received from the ML module 104.

The GUI driver 108 may generate multiple files based on the API specification 222, user input, or some combination thereof. For example, the GUI driver 108 may generate a style file 224 based on user input. The style file 224 may be the same as or similar to the style file discussed above in relation to FIG. 1. The style file 224 may include data for formatting API objects or other information of the API specification 222 that is displayed via the GUI on the display screen 112. For example, the style file 224 may be used for formatting API objects that are displayed in the Tree View 337 and displayed as part of the entire API specification 222 being displayed by the specification viewer module 107. For example, if a particular API object definition has been formatted to be displayed with red highlighting, API objects associated with the particular API object definition may be displayed in the Tree View 337 or as part of the entire API specification 222 with red highlighting.

The GUI driver 108 may generate a temporary file 230. The temporary file 230 may be generated based on the API specification 222. In some embodiments, the temporary file 230 may be generated to include data representative of the entire API specification 222. In other embodiments, the temporary file 230 may be generated to include data representative of a current API page being viewed by the user via the GUI on the display screen 112. For example, if the API specification includes three API pages and the user is currently viewing and/or annotating a second API page, the temporary file may include data representative of only the second API page.

The GUI driver 108 may generate an application file 228 based on user input received via the GUI displayed on the display screen 112. The application file 228 may include data representative of functions to be applied to the temporary file 230 (e.g., code for annotating the data representative of the API specification 222). For example, the user input may indicate that the formatting for a particular API object definition is to be changed and the application file may include functions to be applied to the temporary file 230 to update the formatting of API objects that use the particular API object definition.

The GUI driver 108 may generate an injection file 232 based on user input received via the GUI displayed on the display screen 112. The injection file 232 may include data representative of functions that are to be injected into the temporary file 230 (e.g., data representative of functions that are to be injected into the data representative of the API specification 222). For example, the injection file 232 may include code for and data representative of additional API objects to be injected into the data representative of the API specification 222 in the temporary file 230.

Likewise, the GUI driver 108 may generate a display file 226 based on the style file 224, the application file 228, the temporary file 230, the injection file 232, user input, or any combination thereof. The display file 226 may permit the API objects and other information in the API specification 222 to be displayed via the GUI on the display screen 112 in the Tree View 337 and/or as part of the entire API specification 222 being displayed by the specification viewer module 107. The display file 226 may permit the user to view and annotate the information contained within the API specification 222 via the GUI displayed on the display screen 112 by updating the style file 224, the application file 228, the temporary file 230, the injection file 232, or any combination thereof based on user input received via the GUI displayed on the display screen 112.

Figure 6:
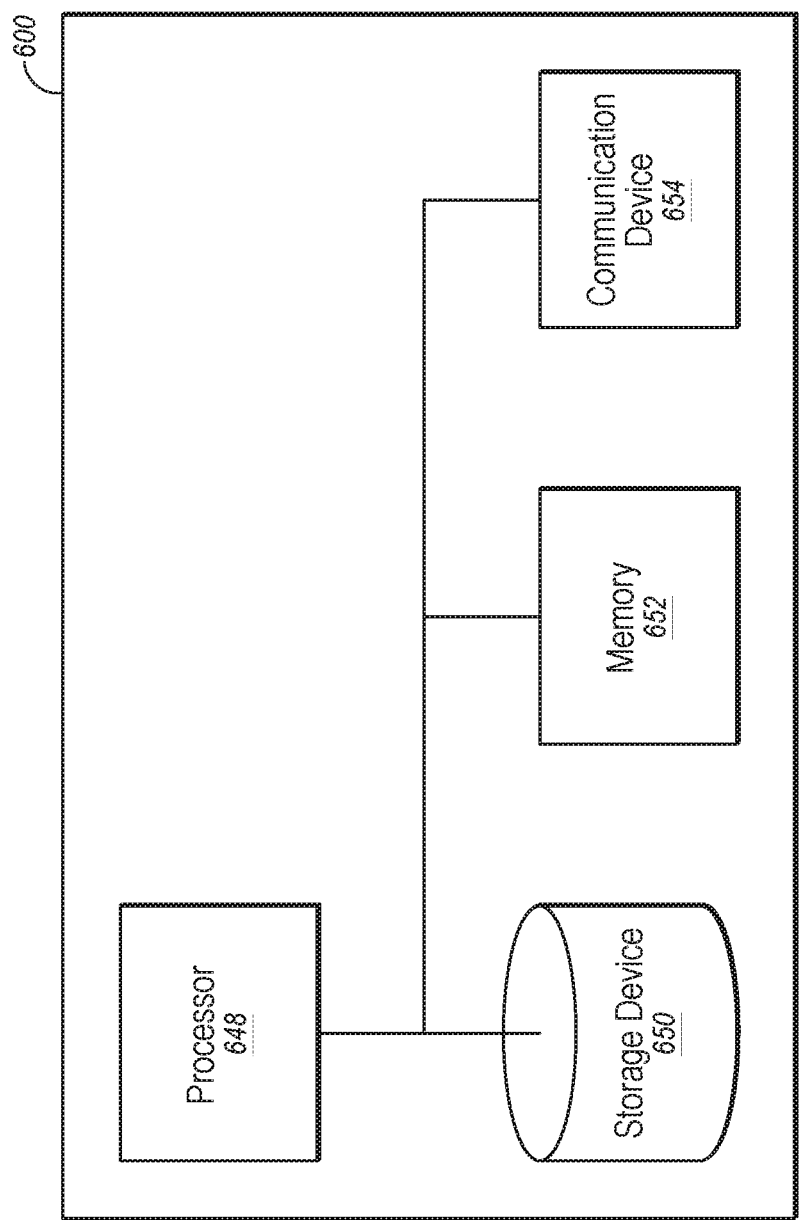
FIG. 6 is a block diagram of an example computing system.

FIG. 6 is a block diagram of an example computing system 600. The computing system 600 may be included in the computing device 102 of FIG. 1 in some embodiments. Additionally or alternatively, the computing system 600 may be included in a desktop computer, a laptop computer, a server computer, a tablet computer, a mobile phone, a smartphone, a personal digital assistant (PDA), an e-reader device, a network switch, a network router, a network hub, other networking devices, or other suitable computing device.

The computing system 600 may include a processor 648, a storage device 650, the memory 652, and a communication device 654. The processor 648, the storage device 650, the memory 652, and/or the communication device 654 may all be communicatively coupled such that each of the components may communicate with the other components. The computing system 600 may perform any of the operations described in the present disclosure.

In general, the processor 648 may include any suitable special-purpose or general-purpose computer, computing entity, or processing device including various computer hardware or software modules and may be configured to execute instructions stored on any applicable computer-readable storage media. For example, the processor 648 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, the processor 648 may include any number of processors configured to perform, individually or collectively, any number of operations described in the present disclosure.

In some embodiments, the processor 648 may interpret and/or execute program instructions and/or process data stored in the storage device 650, the memory 652, or the storage device 650 and the memory 652. In some embodiments, the processor 648 may fetch program instructions from the storage device 650 and load the program instructions in the memory 652. After the program instructions are loaded into the memory 652, the processor 648 may execute the program instructions.

For example, in some embodiments, one or more of the processing operations for the computing system 600 may be included in the storage device 650 as program instructions. The processor 648 may fetch the program instructions of one or more of the processing operations and may load the program instructions of the processing operations in the memory 652. After the program instructions of the processing operations are loaded into the memory 652, the processor 648 may execute the program instructions such that the computing system 600 may implement the operations associated with the processing operations as directed by the program instructions. The modules described above with respect to FIG. 1 may be examples of program instructions that may be included in the storage device 650.

The storage device 650 and the memory 652 may include computer-readable storage media for carrying or having computer-executable instructions or data structures stored thereon. Such computer-readable storage media may include any available media that may be accessed by a general-purpose or special-purpose computer, such as processor 648. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 648 to perform a certain operation or group of operations.

In some embodiments, the storage device 650 and/or the memory 652 may store data associated with annotating consolidated API specifications. For example, the storage device 650 and/or the memory 652 may store the style file 224, the temporary file 230, the display file 226, the injection file 232, the application file 228, the consolidated API specification, the annotated API specification 116, or any other appropriate form of data discussed in the present disclosure.

The communication device 654 may include any device, system, component, or collection of components configured to allow or facilitate communication between the computing system 600 and another electronic device. For example, the communication device 654 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 654 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 6 without departing from the scope of the present disclosure. For example, the computing system 600 may include more or fewer elements than those illustrated and described in the present disclosure. For example, the computing system 600 may include an integrated display device such as a screen of a tablet or mobile phone or may include an external monitor, a projector, a television, or other suitable display device that may be separate from and communicatively coupled to the computing system 600.

Figure 7:
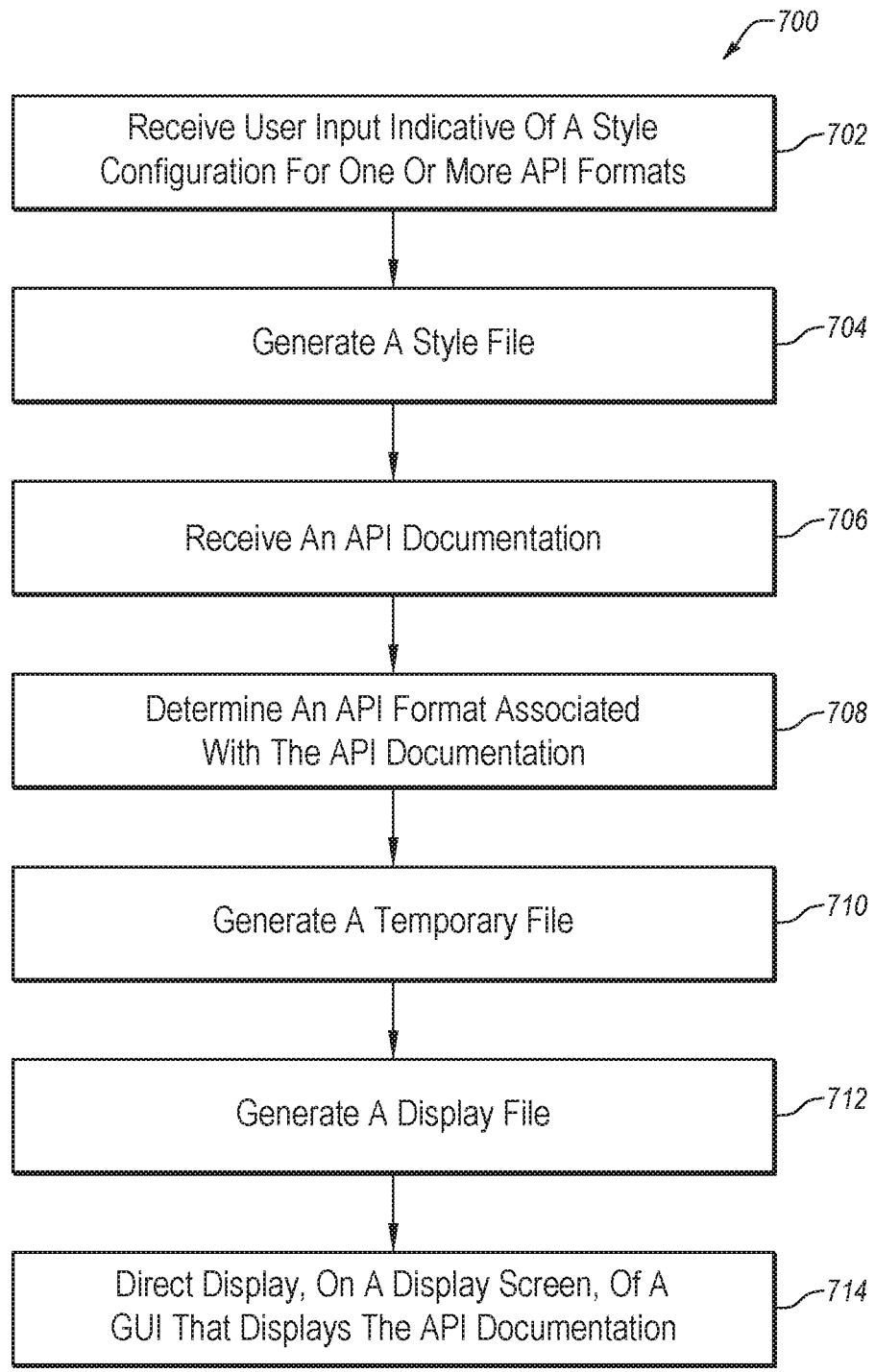
FIG. 7 illustrates a flowchart of an example method of displaying an API specification via a GUI on a display screen, all according to at least one embodiment described in the present disclosure.

FIG. 7 illustrates a flowchart of an example method 700 of displaying an API specification via a GUI on a display screen. The method 700 may be performed by any suitable system, apparatus, or device. For example, the computing device 102, the format module 103, the ML module 104, the GUI driver 108, the specification viewer module 107, the automation module 110, and the display screen 112 of FIG. 1 or one or more of the components of the computing system 600 of FIG. 6. In these and other embodiments, program instructions stored on a computer readable medium may be executed to perform one or more of the operations of the method 700. Further, each operation of the method 700 may be static or dynamic, and may be performed online (e.g., in real-time), or offline. Further, each operation of the method 700 may be performed incrementally or non-incrementally.

The method 700 may include a block 702, at which user input indicative of a style configuration for one or more API specification formats may be received. In some embodiments, the user input may indicate types of formatting for displaying different types of API objects or other information included in API specifications. For example, the format module 103 may receive the user input as discussed above in relation to FIG. 1. Block 702 may be followed by block 704.

At block 704, a style file may be generated. In some embodiments, the style file may include data representative of the style configurations indicated in the user input. The style file may be generated to apply the style configurations to API objects included in API specifications. For example, the format module 103 may generate the style file as discussed above in relation to FIG. 1. Block 704 may be followed by block 706.

At block 706, an API specification may be received. In some embodiments, the API specification may include a consolidated API specification as discussed above. For example, the GUI driver 108 may receive the consolidated API specification from the ML module 104 as discussed above in relation to FIG. 1. Block 706 may be followed by block 708.

At block 708, an API specification format of the API specification may be determined. Responsive to the API specification format of the API specification satisfying a similarity threshold with respect to at least one API specification format of the one or more API specification formats as discussed above in relation to FIG. 1, block 708 may be followed by block 710.

At block 710, a temporary file may be generated. In some embodiments, the temporary file may include data representative of the API specification. In some embodiments, the temporary file may include a list of the API objects in the API specification. For example, the GUI driver 108 may generate the temporary file as discussed above in relation to FIG. 1. Block 710 may be followed by block 712.

At block 712, a display file may be generated. In some embodiments, the display file may include data based on the style file and the temporary file. In some embodiments, the display file may be generated to include at least a portion of the style file and at least a portion of the temporary file. Block 712 may be followed by block 714.

At block 714, display, on a display screen, of a GUI that displays the API specification may be directed. The GUI may be displayed on the display screen based on the display file. In some embodiments, each API object in the API specification may be displayed via the GUI on the display screen to include formatting according to the style configurations indicated in the user input. In some embodiments, the display file may permit the API objects of the API specification to be displayed via the GUI on the display screen 112 in the Tree View 337 as discussed above in relation to FIG. 1.

Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Further, use of the term "and/or" in the present disclosure does not change this interpretation of the use of the term "or" used elsewhere in the present disclosure.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   receiving user input indicative of a style configuration for one or more application programming interface (API) formats;
   generating a style file that includes data representative of the style configurations indicated in the user input;
   receiving an API documentation, the API documentation including a plurality of API objects;
   determining an API format associated with the API documentation;
   responsive to the API format associated with the API documentation satisfying a similarity threshold with respect to at least one API format of the one or more API formats:
      generating a temporary file that includes data representative of the API documentation;
      generating a display file that includes data based on the style file and the temporary file, the display file being generated to include at least a portion of the style file and at least a portion of the temporary file; and
      directing display, on a display screen, of a graphical user interface (GUI) that displays the API documentation based on the display file, wherein each API object of the plurality of API objects is displayed via the GUI to include formatting according to the style configuration indicated in the user input.

2. The method of claim 1, further comprising:
   receiving additional user input indicative of one or more annotations to be made to the API documentation, wherein the one or more annotations to be made the API documentation include adding one or more additional API objects to the plurality of API objects;
   generating an injection file that includes data representative of one or more functions to be injected into to the temporary file to add the one or more additional API objects to the plurality of API objects;
   injecting the data representative of the one or more functions into the temporary file;
   updating the display file based on one or more of the temporary file that includes the injected data representative of the one or more functions and the injection file;
   directing display, on the display screen, of the GUI that displays the API documentation based on the updated display file, wherein the plurality of API objects including the additional API objects are displayed via the GUI according to the style configuration indicated in the user input; and
   generating an API specification that includes the plurality of API objects and the additional API objects in a machine readable format.

3. The method of claim 1, further comprising:
   receiving additional user input indicative of one or more annotations to be made to one or more API objects of the plurality of API objects;
   generating an application file that includes data representative of one or more functions to be applied to the temporary file;
   applying the one or more functions to the temporary file, wherein the one or more functions being applied to the temporary file updates data representative of at least one API object of the plurality of API objects;

updating the display file based on one or more of the temporary file that includes the updated data representative of at least one API object of the plurality of API objects and the application file; and directing display, on the display screen, of the GUI that displays the API documentation based on the updated display file, wherein the plurality of API objects including the annotated one or more API objects of the plurality of API objects are displayed via the GUI to include formatting according to the style configuration indicated in the user input; and generating an API specification that includes the plurality of API objects and the annotated one or more API objects of the plurality of API objects in a machine readable format.

4. The method of claim 3, further comprising:

identifying one or more related API objects of the plurality of API objects, the related API objects of the plurality of API objects being related to the one or more API objects of the plurality of API objects to be annotated; and automatically annotating the data representative of the related API objects of the plurality of API objects based on the annotations to be made to the one or more API objects of the plurality of API objects indicated in the additional user input, wherein the API specification includes the plurality of API objects and the annotated related API objects of the plurality of API objects in the machine readable format.

5. The method of claim 4, wherein the identifying the one or more related API objects of the plurality of API objects comprises:

identifying each table header associated with the one or more API objects of the plurality of API objects to be annotated;

identifying content of each table associated with the one or more API objects of the plurality of API objects to be annotated;

comparing each table header associated with the one or more API objects of the plurality of API objects to be annotated to each table header associated with the plurality of API objects;

comparing the content of each table associated with the one or more API objects of the plurality of API objects to be annotated to the content of each table associated with the plurality of API objects; and identifying the one or more related API objects based on at least one of the table header and the content associated with an API object of the plurality of API objects being the same as or similar to one or more table headers and the content associated with the one or more API objects of the plurality of API objects to be annotated.

6. The method of claim 3, wherein the API documentation is a first API documentation, the plurality of API objects is a first plurality of API objects, the application file is a first application file, and the temporary file is a first temporary file, the method further comprising:

receiving a second API documentation, the second API documentation including a second plurality of API objects;

determining the API format associated the second API documentation;

responsive to the API format associated with the second API documentation being the same as or similar to at least one API format of the one or more API formats:

identifying one or more related API objects of the second plurality of API objects, the one or more related API objects of the second plurality of API objects being related to the one or more API objects of the first plurality of API objects to be annotated;

generating a second temporary file that includes data representative of the second API documentation;

generating a second application file that includes data representative of one or more functions to be applied to the second temporary file; and automatically applying the one or more functions to the second temporary file, wherein the one or more functions update data representative of at least one API object of the second plurality of API objects.

7. The method of claim 3, wherein the API documentation also includes one or more hypertext markup language (HTML) tables and the one or more annotations to be made to the one or more API objects of the plurality of API objects includes associating the one or more API objects of the plurality of API objects with one or more rows, columns, cells, or some combination thereof of at least one of the HTML tables.

8. A system comprising:

one or more computer-readable storage media configured to store instructions; and one or more processors communicatively coupled to the one or more computer-readable storage media and configured to, in response to execution of the instructions, cause the system to perform operations of displaying a GUI on a display screen for annotation of an API documentation, the operations comprising:

receiving user input indicative of a style configuration for one or more API formats;

generating a style file that includes data representative of the style configurations indicated in the user input;

receiving the API documentation, the API documentation including a plurality of API objects;

determining an API format associated with the API documentation;

responsive to the API format associated with the API documentation satisfying a similarity threshold with respect to at least one API format of the one or more API formats:

generating a temporary file that includes data representative of the API documentation;

generating a display file that includes data based on the style file and the temporary file, the display file being generated to include at least a portion of the style file and at least a portion of the temporary file; and directing display, on the display screen, of the GUI that displays the API documentation based on the display file, wherein each API object of the plurality of API objects is displayed via the GUI to include formatting according to the style configuration indicated in the user input.

9. The system of claim 8, the operations further comprising:

receiving additional user input indicative of one or more annotations to be made to the API documentation, wherein the one or more annotations to be made the API documentation include adding one or more additional API objects to the plurality of API objects;

generating an injection file that includes data representative of one or more functions to be injected into to the temporary file to add the one or more additional API objects to the plurality of API objects;

injecting the data representative of the one or more functions into the temporary file;

updating the display file based on one or more of the temporary file that includes the injected data representative of the one or more functions and the injection file;

directing display, on the display screen, of the GUI that displays the API documentation based on the updated display file, wherein the plurality of API objects including the additional API objects are displayed via the GUI according to the style configuration indicated in the user input; and generating an API specification that includes the plurality of API objects and the additional API objects in a machine readable format.

10. The system of claim 8, the operations further comprising:

receiving additional user input indicative of one or more annotations to be made to one or more API objects of the plurality of API objects;

generating an application file that includes data representative of one or more functions to be applied to the temporary file;

applying the one or more functions to the temporary file, wherein the one or more functions being applied to the temporary file updates data representative of at least one API object of the plurality of API objects;

updating the display file based on one or more of the temporary file that includes the updated data representative of at least one API object of the plurality of API objects and the application file; and directing display, on the display screen, of the GUI that displays the API documentation based on the updated display file, wherein the plurality of API objects including the annotated one or more API objects of the plurality of API objects are displayed via the GUI to include formatting according to the style configuration indicated in the user input; and generating an API specification that includes the plurality of API objects and the annotated one or more API objects of the plurality of API objects in a machine readable format.

11. The system of claim 10, the operations further comprising:

identifying one or more related API objects of the plurality of API objects, the related API objects of the plurality of API objects being related to the one or more API objects of the plurality of API objects to be annotated; and automatically annotating the data representative of the related API objects of the plurality of API objects based on the annotations to be made to the one or more API objects of the plurality of API objects indicated in the additional user input, wherein the API specification includes the plurality of API objects and the annotated related API objects of the plurality of API objects in the machine readable format.

12. The system of claim 11, wherein the operation of identifying the one or more related API objects of the plurality of API objects comprises:

identifying each table header associated with the one or more API objects of the plurality of API objects to be annotated;

identifying content of each table associated with the one or more API objects of the plurality of API objects to be annotated;

comparing each table header associated with the one or more API objects of the plurality of API objects to be annotated to each table header associated with the plurality of API objects;

comparing the content of each table associated with the one or more API objects of the plurality of API objects to be annotated to the content of each table associated with the plurality of API objects; and identifying the one or more related API objects based on at least one of the table header and the content associated with an API object of the plurality of API objects being the same as or similar to one or more table headers and the content associated with the one or more API objects of the plurality of API objects to be annotated.

13. The system of claim 10, wherein the API documentation is a first API documentation, the plurality of API objects is a first plurality of API objects, the application file is a first application file, and the temporary file is a first temporary file, the operations further comprising:

receiving a second API documentation, the second API documentation including a second plurality of API objects;

determining the API format associated with the second API documentation;

responsive to the API format associated with the second API documentation being the same as or similar to at least one API format of the one or more API formats:

identifying one or more related API objects of the second plurality of API objects, the one or more related API objects of the second plurality of API objects being related to the one or more API objects of the first plurality of API objects to be annotated;

generating a second temporary file that includes data representative of the second API documentation;

generating a second application file that includes data representative of one or more functions to be applied to the second temporary file; and automatically applying the one or more functions to the second temporary file, wherein the one or more functions update data representative of at least one API object of the second plurality of API objects.

14. The system of claim 10, wherein the API documentation also includes one or more HTML tables and the one or more annotations to be made to the one or more API objects of the plurality of API objects includes associating the one or more API objects of the plurality of API objects with one or more rows, columns, cells, or some combination thereof of at least one of the HTML tables.

15. One or more non-transitory computer-readable storage media configured to store instructions that, in response to being executed, cause a system to perform operations, the operations comprising:

receiving user input indicative of a style configuration for one or more API formats;

generating a style file that includes data representative of the style configurations indicated in the user input;

receiving an API documentation, the API documentation including a plurality of API objects;

determining an API format associated with the API documentation;

responsive to the API format associated with the API documentation satisfying a similarity threshold with respect to at least one API format of the one or more API formats:

generating a temporary file that includes data representative of the API documentation;

generating a display file that includes data based on the style file and the temporary file, the display file being generated to include at least a portion of the style file and at least a portion of the temporary file; and directing display, on a display screen, of a GUI that displays the API documentation based on the display file, wherein each API object of the plurality of API objects is displayed via the GUI to include formatting according to the style configuration indicated in the user input.

16. The one or more non-transitory computer-readable storage media of claim 15, wherein the operations further comprise:

receiving additional user input indicative of one or more annotations to be made to the API documentation, wherein the one or more annotations to be made the API documentation include adding one or more additional API objects to the plurality of API objects;

generating an injection file that includes data representative of one or more functions to be injected into to the temporary file to add the one or more additional API objects to the plurality of API objects;

injecting the data representative of the one or more functions into the temporary file;

updating the display file based on one or more of the temporary file that includes the injected data representative of the one or more functions and the injection file;

directing display, on the display screen, of the GUI that displays the API documentation based on the updated display file, wherein the plurality of API objects including the additional API objects are displayed via the GUI according to the style configuration indicated in the user input; and generating an API specification that includes the plurality of API objects and the additional API objects in a machine readable format.

17. The one or more non-transitory computer-readable storage media of claim 15, wherein the operations further comprise:

receiving additional user input indicative of one or more annotations to be made to one or more API objects of the plurality of API objects;

generating an application file that includes data representative of one or more functions to be applied to the temporary file;

applying the one or more functions to the temporary file, wherein the one or more functions being applied to the temporary file updates data representative of at least one API object of the plurality of API objects;

updating the display file based on one or more of the temporary file that includes the updated data representative of at least one API object of the plurality of API objects and the application file; and directing display, on the display screen, of the GUI that displays the API documentation based on the updated display file, wherein the plurality of API objects including the annotated one or more API objects of the plurality of API objects are displayed via the GUI to include formatting according to the style configuration indicated in the user input; and generating an API specification that includes the plurality of API objects and the annotated one or more API objects of the plurality of API objects in a machine readable format.

18. The one or more non-transitory computer-readable storage media of claim 17, wherein the operations further comprise:

identifying one or more related API objects of the plurality of API objects, the related API objects of the plurality of API objects being related to the one or more API objects of the plurality of API objects to be annotated; and automatically annotating the data representative of the related API objects of the plurality of API objects based on the annotations to be made to the one or more API objects of the plurality of API objects indicated in the additional user input, wherein the API specification includes the plurality of API objects and the annotated related API objects of the plurality of API objects in the machine readable format.

19. The one or more non-transitory computer-readable storage media of claim 18, wherein identifying the one or more related API objects of the plurality of API objects comprises:

identifying each table header associated with the one or more API objects of the plurality of API objects to be annotated;

identifying content of each table associated with the one or more API objects of the plurality of API objects to be annotated;

comparing each table header associated with the one or more API objects of the plurality of API objects to be annotated to each table header associated with the plurality of API objects;

comparing the content of each table associated with the one or more API objects of the plurality of API objects to be annotated to the content of each table associated with the plurality of API objects; and identifying the one or more related API objects based on at least one of the table header and the content associated with an API object of the plurality of API objects being the same as or similar to one or more table headers and the content associated with the one or more API objects of the plurality of API objects to be annotated.

20. The one or more non-transitory computer-readable storage media of claim 17, wherein the API documentation is a first API documentation, the plurality of API objects is a first plurality of API objects, the application file is a first application file, and the temporary file is a first temporary file, the operations further comprise:

receiving a second API documentation, the second API documentation including a second plurality of API objects;

determining the API format associated with the second API documentation;

responsive to the API format associated with the second API documentation being the same as or similar to at least one API format of the one or more API formats:

identifying one or more related API objects of the second plurality of API objects, the one or more related API objects of the second plurality of API objects being related to the one or more API objects of the first plurality of API objects to be annotated;

generating a second temporary file that includes data representative of the second API documentation;

generating a second application file that includes data representative of one or more functions to be applied to the second temporary file; and automatically applying the one or more functions to the second temporary file, wherein the one or more functions update data representative of at least one API object of the second plurality of API objects.

\* \* \* \* \*